United States Patent
Finger

(10) Patent No.: US 8,808,509 B2
(45) Date of Patent: Aug. 19, 2014

(54) PYROLYTIC GAS GENERATOR

(75) Inventor: Ulrich Finger, Oberthingau (DE)

(73) Assignee: von Goertz & Finger GmbH, Schlitz (DE)

( * ) Notice: Subject to any disclaimer, the term of this patent is extended or adjusted under 35 U.S.C. 154(b) by 1013 days.

(21) Appl. No.: 12/735,334

(22) PCT Filed: Jan. 7, 2008

(86) PCT No.: PCT/EP2008/050100
§ 371 (c)(1),
(2), (4) Date: Sep. 23, 2010

(87) PCT Pub. No.: WO2009/086926
PCT Pub. Date: Jul. 16, 2009

(65) Prior Publication Data
US 2011/0005913 A1 Jan. 13, 2011

(51) Int. Cl.
*C10B 53/02* (2006.01)
*C10B 47/44* (2006.01)
*C10K 1/02* (2006.01)
*B01D 46/00* (2006.01)
*B01D 46/24* (2006.01)

(52) U.S. Cl.
CPC ............ *B01D 46/2407* (2013.01); *C10K 1/024* (2013.01); *B01D 2273/20* (2013.01); *B01D 46/0068* (2013.01)
USPC ............. 202/98; 202/118; 202/137; 202/150; 110/216; 110/230; 110/322; 110/110

(58) Field of Classification Search
USPC ......... 202/96, 97, 98, 99, 117, 118, 137, 150; 201/3, 13, 28, 29; 110/215, 216, 229, 110/230, 322, 110
See application file for complete search history.

(56) References Cited

U.S. PATENT DOCUMENTS

| | | | | |
|---|---|---|---|---|
| 3,998,933 A | * | 12/1976 | Henderson et al. | 423/448 |
| 4,308,103 A | * | 12/1981 | Rotter | 202/117 |
| 4,419,185 A | * | 12/1983 | Bowen et al. | 201/4 |
| 4,465,556 A | * | 8/1984 | Bowen et al. | 202/99 |
| 5,411,714 A | * | 5/1995 | Wu et al. | 422/232 |

(Continued)

FOREIGN PATENT DOCUMENTS

| | | | |
|---|---|---|---|
| DE | 3720958 A1 * | 1/1989 | ................ C10J 3/84 |
| EP | 0 839 893 | 5/1998 | |
| EP | 1 865 045 | 12/2007 | |
| WO | WO 2006/093373 | 9/2006 | |

OTHER PUBLICATIONS

International Search Report of PCT/EP2008/050100 with a mailing date of Dec. 1, 2009.

(Continued)

*Primary Examiner* — Nina Bhat
*Assistant Examiner* — Jonathan Miller
(74) *Attorney, Agent, or Firm* — Collard & Roe, P.C.

(57) ABSTRACT

Pyrolytic gas generator for generating clean useful gas from biomass, particularly wood, oil seeds or the like, where a gasification channel in multi-chambered construction is provided, which gasification channel is provided with an assist burner which can supply heat from the outside to the gasification channel during gasification of the biomass, a pre-pyrolyzing pipe is connected upstream of the gasification channel and an ash discharge downstream of the gasification channel, wherein the generated gases are re-gasified in the gasification channel while the material to be gasified is mechanically transported from a material container to the ash discharge.

31 Claims, 5 Drawing Sheets

(56) References Cited

U.S. PATENT DOCUMENTS

| | | | |
|---|---|---|---|
| 6,615,748 B2 * | 9/2003 | Sunter et al. | 110/233 |
| 8,372,169 B2 * | 2/2013 | Tsangaris et al. | 48/120 |
| 2008/0006520 A1 * | 1/2008 | Badger et al. | 202/96 |
| 2008/0210089 A1 * | 9/2008 | Tsangaris et al. | 95/90 |

OTHER PUBLICATIONS

International Preliminary Report on Patentability in PCT/EP2008/050100, Aug. 10, 2010.

\* cited by examiner

PYROLYTIC GAS GENERATOR

CROSS REFERENCE TO RELATED APPLICATIONS

This application is the National Stage of PCT/EP2008/050100 filed on Jan. 7, 2008. The international application under PCT article 21(2) was not published in English.

BACKGROUND OF THE INVENTION

1. Field of the Invention

The invention relates to a pyrolytic gas generator for generating clean useful gas from biomass, particularly wood, oil seeds or the like.

2. The Prior Art

Various gas generators of that kind are known, which, however, all have the disadvantage of being able to be handled only with difficulty, not providing satisfactory efficiency and not having a cleanness of the gas satisfying the requirements for further utilisation of the generated gas in, for example, block heating plants.

In addition, problems persistently arise in the gasification of seeds containing oil, press cakes of these seeds or the like.

SUMMARY OF THE INVENTION

The present invention therefore has the object of proposing a gas generator which can be operated not only with wood, but also with seeds containing oil such as, for example, rape, press cakes or other biomass and in that case supplies high-quality pyrolysis useful gas.

According to the invention this object is fulfilled in that a gasification channel in multi-chambered construction is provided, which gasification channel is provided with an assist burner which can supply heat from the outside to the gasification channel during gasification of the biomass, a pre-pyrolyzing pipe is connected upstream of the gasification channel and an ash discharge downstream of the gasification channel, wherein the generated gases are re-gasified in the gasification channel whilst the material to be gasified is mechanically transported from a material container to the ash discharge.

Through the multi-chambered construction it is ensured that the pyrolysis process always takes place under optimal conditions.

In that case it has proved very advantageous if both the pre-pyrolyzing pipe and the gasification channel have a channel for the feed of external heat.

The pyrolysis is started and maintained by the feed of external heat.

Similarly, it is very advantageous if the heat feed channel is arranged substantially below the respective process channel, but nevertheless surrounds this.

In this regard it has also proved very advantageous in accordance with the invention if the heat feed channel is arranged below the process channel and at the end remote from the assist burner then goes over into a channel surrounding the process channel.

A very uniform heat feed is thereby secured.

A very advantageous embodiment in accordance with the invention is also present when guide plates which protrude into the heat feed channel are provided at the gasification channel and/or at the pre-pyrolyzing pipe.

The heat transfer between heat feed channel and process channel is thereby further improved.

A very advantageous development of the invention is also present if a conveying screw or transport worm or another form of transport device for uniform transport of the gasification material is provided in the pre-pyrolyzing pipe and/or in the gasification channel.

Very good utilisation of the gasification material is thereby guaranteed.

According to the invention it is also very advantageous if a coke container with coarse coke is provided, through which the generated useful gas is conducted for filtering and cooling.

A very wide-ranging cleaning and cooling of the useful gas is thereby achieved.

In that case it has proved very advantageous if a gas inlet duct is provided in the roof region of the coke container above the charge material.

Equally, it is very advantageous if a gas outlet duct consisting of a plurality of pipes is provided in the lower region of the coke container.

A very good throughflow of the coarse coke by the useful gas on the one hand and only slight entrainment of coke particles by the cleaned gas on the other hand are secured by the two measures.

It is also extremely advantageous if a device for the feed of coke laden with gas residues to the gas channel is provided.

The laden coke is then degasified together with the pyrolyzing material and thus used.

According to a further embodiment of the invention it is also very advantageous if a discharge for incompletely gasified gasification material is provided at the end of the gasification channel.

Thus, an accumulation of incompletely gasified gasification material in the gasification channel is avoided.

In that case it is extremely advantageous if a feed device is provided, which is capable of feeding the discharged gasification material to the start of the gasification pipe.

The incompletely gasified and discharged gasification material is thus fed again to the pyrolyzing process and completely gasified.

Equally, in accordance with the invention it is very advantageous if a feed device is provided which feeds the discharged gasification material to the coke container.

Coke arises particularly in the gasification of wood, the coke then being equally capable of use for filtering the useful gas.

In that case it has proved very advantageous if a filter device is provided which is capable of filtering small particles out of the incompletely gasified gasification material prior to feed to the coke container.

Excessively small particles of the coke would hamper or even prevent throughflow of the coke container by useful gas.

However, in that case it has also proved very advantageous if a feed of the filtered gasification material to the discharge of the coke container is provided.

The filtered gasification material is thus nevertheless completely utilised.

A further very advantageous embodiment of the invention also resides in providing a filter for the hot useful gas, which filter is connected downstream of the gasification channel and is capable of filtering out the solid residues in the useful gas and entrained ash and dust.

Ash is thereby removed from the system.

It has in that regard proved very advantageous if the filter is constructed as a ceramic filter with a plurality of filter channels.

The ash and dust settle in the ceramic filter.

According to a further development of the invention it has also proved very advantageous if a cleaning device is provided in the filter.

Blocking of the filter is thus avoided and a uniform filtering performance ensured.

In that regard it is extremely advantageous if a plurality of gas nozzles is provided as cleaning device, which nozzles are acted on in pulsating manner by cleaned useful gas under pressure.

Through this embodiment the filter is very effectively cleaned without having to resort to mechanical methods or methods introducing air.

A further very advantageous embodiment of the invention is also to be seen in providing a cooler for cooling the useful gas, preferably after the filter.

The useful gas is cooled down from the high process temperature by a cooler. A cooler can be provided additionally to or instead of the coke container.

In that case it is very advantageous if the cooler is constructed as a tube cooler, in the tubes of which rotating brushes are provided, which brushes are capable of transporting oil, tar, water and other forms of deposits, which condense at the tube inner walls, away to a collecting unit.

In that case it is extremely advantageous if the brushes are of helical construction and/or if the tubes are arranged to be upright.

Through these embodiments on the one hand a good cooling effect and on the other hand also very good removal of oil, tar, water and other substances are guaranteed.

A further extremely advantageous embodiment of the invention is also present when a gas washer in which the gas is washed with the help of an oil mist is provided.

Further particles still present in the useful gas are removed by the gas washer.

In that regard it has proved extremely advantageous if several rotating oil nozzles are provided, which are surrounded by a similarly rotating centrifuging wheel and the gas is introduced into the space between nozzles and centrifuging wheel.

The entire useful gas is thereby mixed with a very finely distributed and homogenous oil mist.

According to the invention it has also proved very advantageous if a mist collector capable of separating the useful gas from the oil mist is provided.

In that case it is very advantageous if a plurality of baffle plates is provided, which are arranged to be offset and/or angled relative to one another, wherein the oil mist mixed with contaminants is separated at these baffle plates and conducted away to an oil reserve.

Through a mist collector of that kind the oil mist is effectively separated again from the useful gas.

In addition, it has proved very advantageous if a filter insert is connected downstream of the gas washer.

Any oil droplets entrained by the mist collector are at the latest caught at this filter insert.

Nevertheless, loading of the filter insert is extremely small, so that long service lives are achieved.

It has also proved very advantageous if the mist collector is arranged coaxially with the oil washer.

A very compact mode of construction of the gas washer is thereby achieved.

A further very advantageous embodiment of the invention also resides in providing a feed of the laden oil to the assist burner.

Thus, not only the oil laden with particles is meaningfully utilised, but also an additional preheating of the oil fed to the assist burner is secured. A preheating of that kind is useful or necessary particularly in the case of use of plant oils, especially rape oil, soya oil, palm oil or the like.

A further very advantageous development of the invention also resides in connecting a safety device for prevention of flashbacks or the like downstream of the gas generator.

In that case it has proved very advantageous if a water bath is provided through which the useful gas is conducted.

There is thus achieved in simple mode and manner a flashback protection which, in addition, is extremely insensitive relative to possibly aggressive constituents of the useful gas.

BRIEF DESCRIPTION OF THE DRAWINGS

The invention is explained in the following by way of several exemplifying embodiments.

In that case.

DETAILED DESCRIPTION OF THE DRAWINGS

Figure 1:
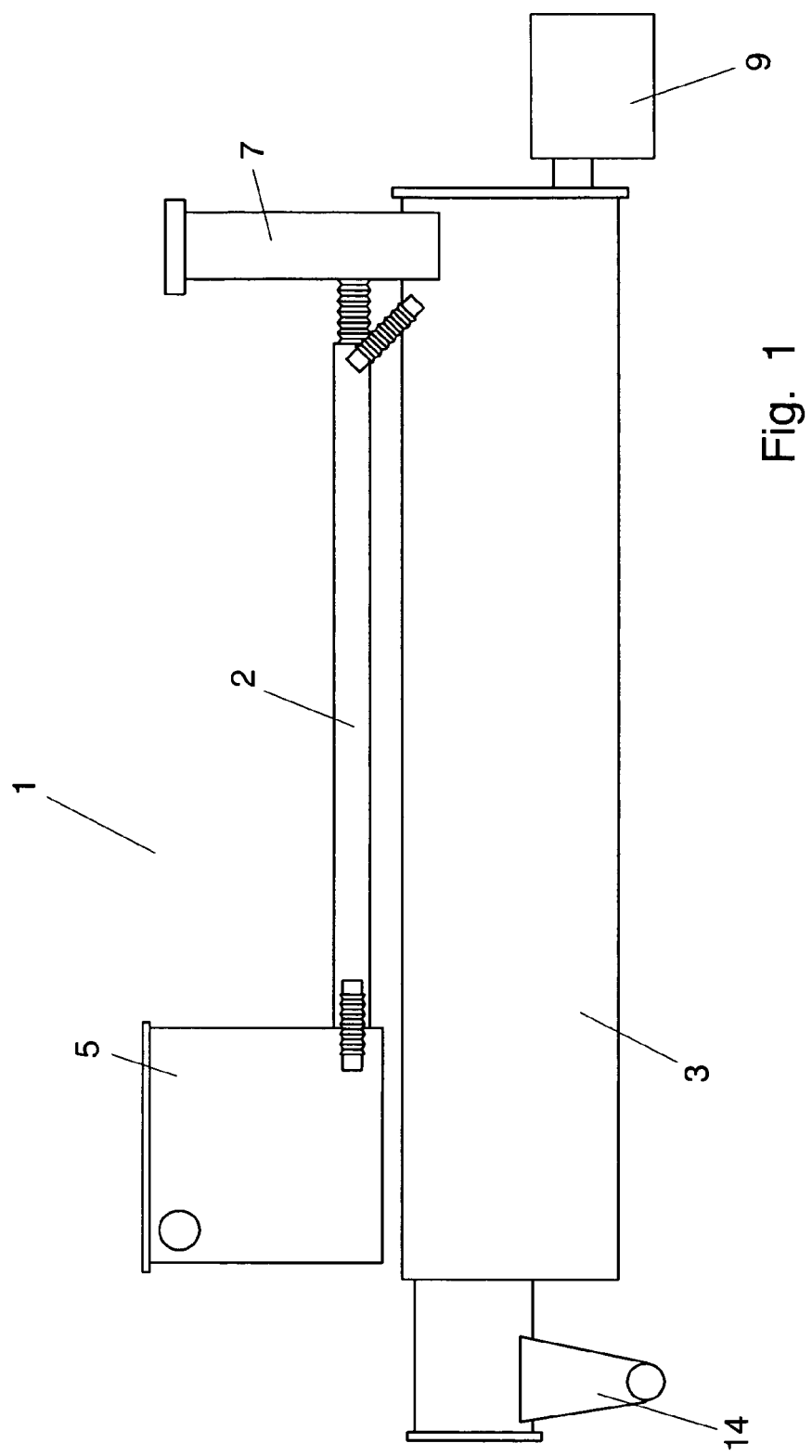
FIG. 1 shows a schematic illustration of a pyrolytic gas generator.
Figure 2:
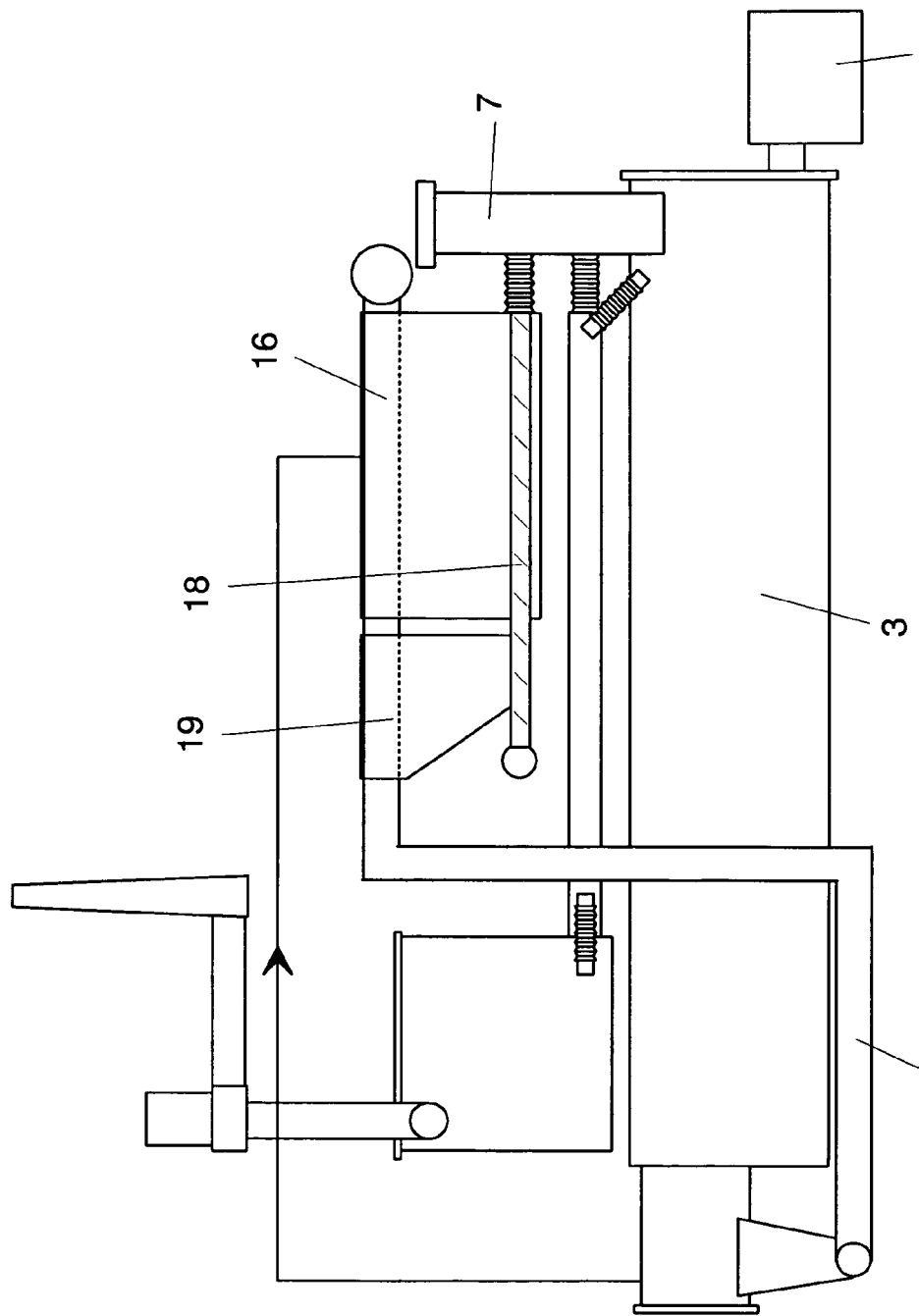
FIG. 2 shows a schematic illustration of a further gas generator with a coke container.
Figure 3:
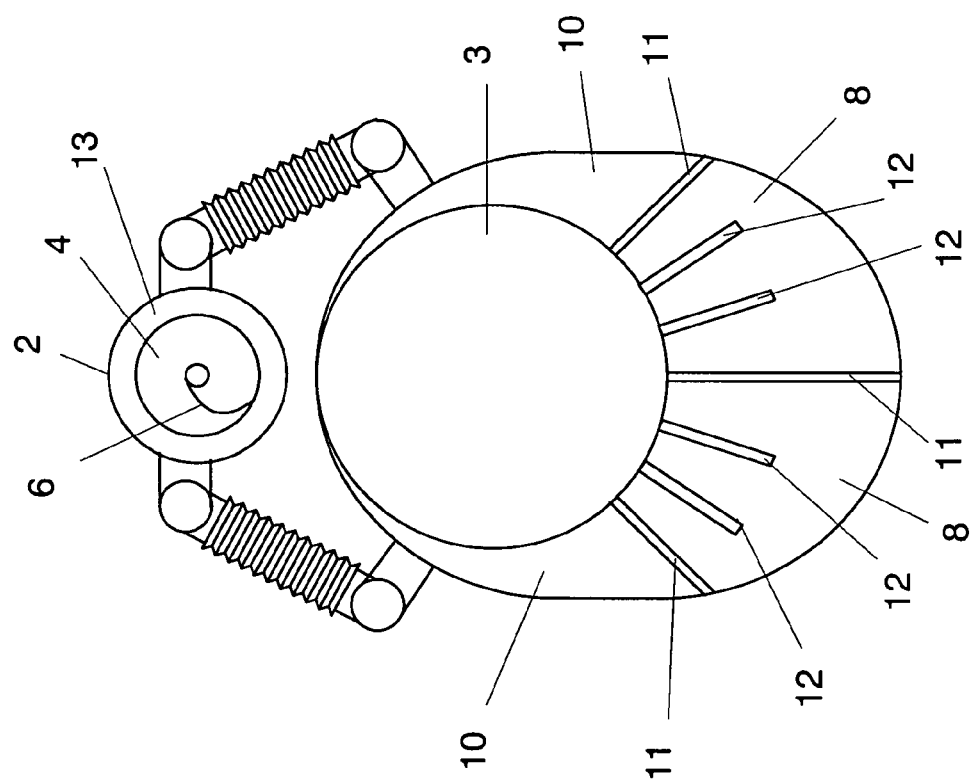
FIG. 3 shows a section through a gasification channel and a pre-pyrolyzing pipe.
Figure 4:
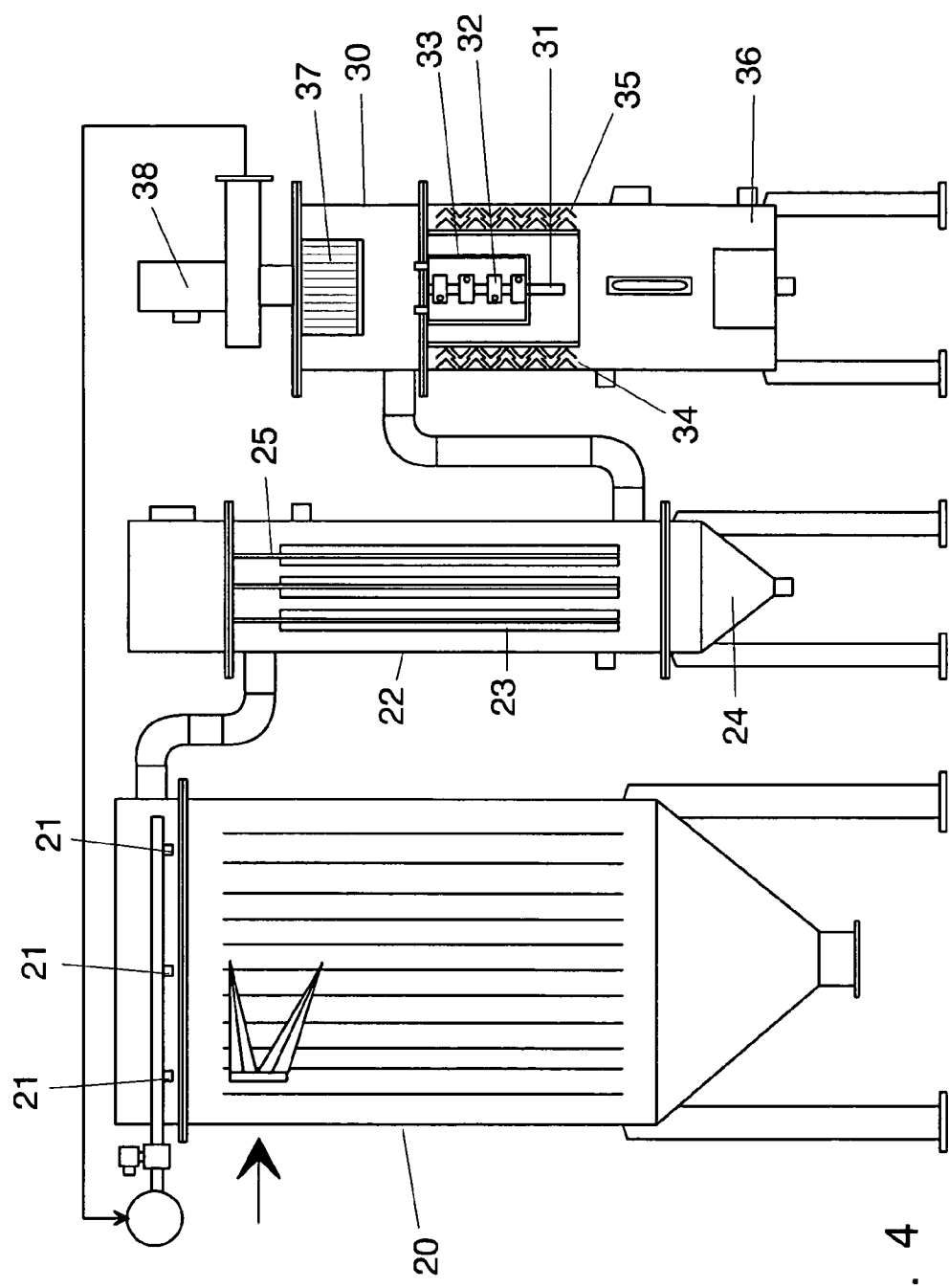
FIG. 4 shows a schematic illustration of a hot-gas filter, useful gas filter and a gas washer.
Figure 5:
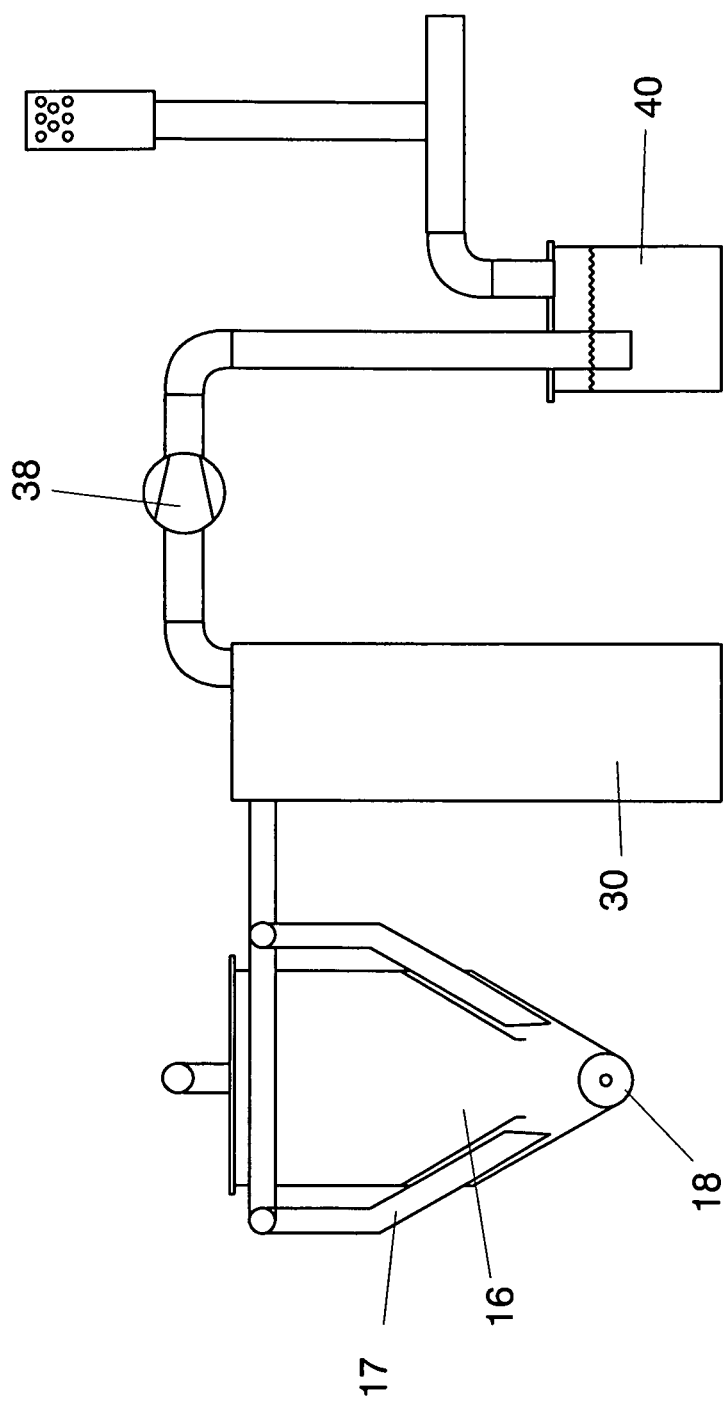
FIG. 5 shows a detailed illustration of a flashback protection means.

A pyrolytic gas generator, which is constructed substantially from a pre-pyrolyzing pipe 2 and a gasification channel 3 and which serves for production of useful gas, often known as wood gas, from gasification material, is denoted by 1 in FIG. 1. The pre-pyrolyzing pipe 2 is of coaxial double-walled construction. The gasification material is conveyed into the inner region 4 from a storage container 5 by means of a conveying worm 6 via the pre-pyrolyzing pipe 2. The gasification material is dried and pre-pyrolyzed in the pre-pyrolyzing pipe 2 and then subsequently passes through a filling shaft 7 into the gasification channel 3. Arranged below the gasification channel 3 is a lower chamber 8 into which an assist burner 9 gives off heat. The assist burner 9 is in that case arranged at the same end of the gasification channel 3 at which the filling shaft 7 is also arranged. Arranged at the end of the lower chamber 8 remote from the assist burner 9 is a transition to an upper chamber 10 which in the upper region surrounds the gasification channel 3. The gasification channel 3 is completely surrounded by the upper chamber 10 and the lower chamber 8. Provided below the gasification channel 3 is a support 11 which is constructed at least in sections and which prevents twisting and warping of the gasification channel 3. In addition, guide plates 12 ensuring better heat transfer between lower chamber 8 and gasification channel 3 and thus a sufficient temperature for the pyrolytic gasification of the gasification material are provided to project into the lower chamber 8 and go out from the gasification channel 3. Usual temperatures for gasification of biomass lie between 200 and 1000° C.

The waste heat of the upper chamber 10 is then fed to the outer chamber 13 of the pre-pyrolyzing pipe 2. Thereafter, the still warm flue gases of the assist burner 9 are conducted through the storage container 5, whereby the gasification material there is already preheated.

The gasification material is mechanically transported in the gasification channel 3 as also in the pre-pyrolyzing pipe 2. This can again be carried out by a conveying worm, which, however, is not illustrated in the drawings.

Ash is entrained by the useful gas generated in the gasification channel 3. Incompletely gasified gasification material is transferred out at the end of the gasification channel 3 through a lock 14 and either fed directly back to the gasification channel 3 together with new gasification material or, however, added to a coke container 16, through which the generated useful gas can also be conducted for filtering and cooling, by way of a transport device 15 that includes a conveying worm. For this purpose the useful gas is introduced into the upper region of the coke container 16 and conducted out again in the lower region through several pipes 17. The flow speed is reduced by the use of several outlet pipes 17 and thus entraining of coke particles is minimized. The laden coke is then conducted by way of a conveying worm 18 to the filling shaft 7 and similarly completely gasified.

It is also conceivable that other, large-area outlet lines are provided instead of or additionally to the pipe 17. For example, it is conceivable to arrange downwardly directed scoops, through which the useful gas is conducted out, in the coke container 16.

The use of a coke container 16 can, however, come into question only, when wood materials are gasified, because only the coke created in wood gasification can be conducted to the coke container 16. Incompletely gasified gasification material conducted out of the gasification pipe has a quite different grain size. Excessively finely grained material in the coke container 16 leads, however, to an increased resistance to the passage of the useful gas. In addition, the risk increases that coke particles are entrained by the useful gas.

A filter unit 19 is therefore additionally connected upstream of the coke container, which unit is capable of separating out small coke particles and conducts these directly to the conveying worm 18 for complete gasification.

A hot gas filter 20, which can be constructed as a ceramic filter, can be provided directly after the gasification channel 3. A ceramic filter of that kind with, for example, several filter cores ensures deposition of dust and ash. These deposits are then periodically blown away by gas which stands under pressure and which is capable of flowing into the filter 20 through the pressure nozzles 21. Completely cleaned useful gas can be used as blowing-away gas so as to avoid mixing of the useful gas with other components.

A cooler 22, which, for example, has several cooling tubes 23, can additionally also be provided after the hot gas filter 20 and/or after the coke container 16. The useful gas flows through these tubes 23 on the inner side. On cooling down of the useful gas, water, oil and possibly also tar residues deposit on the tube inner walls. These are conducted away on the one hand by an upright arrangement of the tubes 23 to a collecting container 24 mounted thereunder and on the other hand stripped off by rotating, preferably helically constructed, brushes 25.

However, even after that a sufficiently good cleaning of the useful gas still cannot be guaranteed.

For that reason an additional gas washer 30 is provided. The gas washer 30 has nozzle rings 32 which are arranged on a rotating axle 31 and through which oil, particularly plant oil, preferably rape oil is forced and in that case freed of dust. The nozzle rings 32 are arranged within a rotary wheel 33. The useful gas is conducted in between the nozzle rings 32 and the rotary wheel 33. Through the co-operation of the rotating nozzle rings 32 and the similarly rotating rotary wheel 33 a very fine oil mist is generated which completely and homogenously penetrates the useful gas and thus ensures separation of particles, which are still disposed in the useful gas, into the oil droplets.

The oil mist is retained by a mist collector 34, which consists of a plurality of baffle plates 35 arranged at an angle and offset relative to one another. The useful gas has to flow through these baffle plates 35. The oil is retained and drips off into a collecting container 36, which also at the same time serves as a storage container. The mist collector is arranged coaxially outside the dust removal device.

The filter oil can be conducted to the assist burner 9 as fuel, so that at the same time the filtered-out particles are also combusted. A major advantage of this double utilisation of the filter oil is that the oil is already preheated for use in the assist burner and can thus be better combusted. Fresh oil is then regularly conducted, according to need, to the collecting container 36 so as to maintain a predetermined filling state.

The thus-washed useful gas is additionally conducted through a ring filter 37 which is arranged above the mist collector 34 and which receives possibly still entrained oil droplets. The ring filter 37 is in that case, however, loaded to a very small degree so that this has a high service life.

A suction flue 38, which draws the useful gas through the entire plant and thus ensures sub-atmospheric pressure in the plant, is provided after that. Escape of toxic CO from the plant is thus excluded.

A flashback protection device 40, which is constructed as a water bath through which the gas must flow, can additionally be provided after the suction flue 38. Moisture absorption by the useful gas is here negligibly small. On the other hand, however, an effective flashback protection device 40 is formed, which confines detonation or the like to the region after the gas generator 1.

The pyrolytically generated useful gas can then be utilised in, for example, a block heating plant as drive gas.

The invention claimed is:

1. Pyrolytic gas generator for generating clean useful gas from biomass, the pyrolytic gas generator comprising
   a gasification channel in multi-chambered construction,
   an assist burner able to supply heat from the outside to the gasification channel during gasification of the biomass,
   a pre-pyrolyzing pipe connected upstream of the gasification channel, the biomass being dried and pre-pyrolyzed when passed through the pre-pyrolyzing pipe,
   an ash discharge downstream of the gasification channel,
   a coke container with coarse coke, and
   a first transport device connecting a first end of the gasification channel and the coke container so that the gases generated in the gasification channel are conducted from the first end of the gasification channel and to the coke container and through the coke container for filtering and cooling down,
   wherein gasification of the biomass in the gasification channel generates gases whilst the biomass is mechanically transported in the gasification channel towards the ash discharge, the gases forming the clean useful gas.

2. Gas generator according to claim 1, further comprising a first heat feed channel for the feed of external heat to the pre-pyrolyzing pipe, and
   further comprising a second heat feed channel for the feed of external heat to the gasification channel.

3. Gas generator according to claim 2, wherein the second heat feed channel is arranged substantially below the gasification channel and surrounds the gasification channel.

4. Gas generator according to claim 3, wherein the second heat feed channel comprises an upper chamber and a lower chamber and a transition between the upper chamber and the lower chamber at a first end of the second heat feed channel, the first end being disposed remote from the assist burner, wherein the lower chamber is arranged below the gasification channel, and wherein the upper chamber surrounds the gasification channel.

5. Gas generator according to claim 2, further comprising guide plates protruding into the second heat feed channel and disposed at the gasification channel.

6. Gas generator according to claim 1, further comprising a transport device for uniform transport of the gasification material and disposed in at least one of the pre-pyrolyzing pipe and the gasification channel.

7. Gas generator according to claim 1, further comprising a charge material in the coke container, wherein the coke container comprises a roof region and a gas inlet duct in the roof region, and wherein the gas inlet duct is provided above the charge material.

8. Gas generator according to claim 1, wherein the coke container comprises a lower region and a gas outlet duct comprising a plurality of pipes in the lower region.

9. Gas generator according to claim 1, further comprising a coke transport device connecting the coke container and a start of the gasification channel, wherein the coke transport device feeds coke laden with gas residues to the start of the gasification channel.

10. Gas generator according to claim 1, further comprising a biomass discharge for discharging incompletely gasified gasification material and disposed at the first end of the gasification channel.

11. Gas generator according to claim 10, further comprising a second transport device connecting the biomass discharge and a start of the gasification channel, wherein the second transport device is capable of feeding discharged incompletely gasified gasification material to the start of the gasification channel.

12. Gas generator according to claim 10, further comprising a conveyance device connecting the biomass discharge and the coke container, wherein the conveyance device feeds discharged incompletely gasified gasification material to the coke container.

13. Gas generator according to claim 12, further comprising a filter device disposed along the conveyance device upstream from the coke container, wherein the filter device is capable of filtering out small particles from the discharged incompletely gasified gasification material prior to the discharged incompletely gasified gasification material being fed to the coke container.

14. Gas generator according to claim 13, further comprising a coke transport device connecting the coke container and a start of the gasification channel, and further comprising a filtered particle transport device connecting the filter device and the coke transport device, wherein the coke transport device feeds coke laden with gas residues to the start of the gasification channel, and wherein the filtered particle transport device feeds filtered-out gasification material from the filter device to the coke transport device.

15. Gas, generator according to claim 1, further comprising a gas filter for filtering the gases and connected downstream of the gasification channel, wherein the gas filter is capable of filtering out solid residues and entrained ash and dust from the gases to convert the gases to the clean useful gas.

16. Gas generator according to claim 15, wherein the gas filter is a ceramic filter and comprises a plurality of filter channels.

17. Gas generator according to claim 15, further comprising a cleaning device in the gas filter.

18. Gas generator according to claim 17, wherein the cleaning device comprises a plurality of gas nozzles loaded in pulsating manner with cleaned gas standing under pressure.

19. Gas generator according to claim 1, further comprising a cooler for cooling the gases and connected at least indirectly with an end of the gasification channel to convert the gases to the clean useful gas.

20. Gas generator according to claim 1, further comprising a safety device for preventing flashbacks and connected at least indirectly to a first end of the gasification channel.

21. Gas generator according to claim 20, wherein the safety device comprises a water bath, and wherein the gases are conducted through the water bath to convert the gases to clean useful gas.

22. Pyrolytic gas generator for generating clean useful gas from biomass, the pyrolytic gas generator comprising a gasification channel in multi-chambered construction, an assist burner able to supply heat from the outside to the gasification channel during gasification of the biomass, a pre-pyrolyzing pipe connected upstream of the gasification channel, the biomass being dried and pre-pyrolyzed when passed through the pre-pyrolyzing pipe, an ash discharge downstream of the gasification channel, and a cooler for cooling the gases and connected at least indirectly with an end of the gasification channel to convert the gases to the clean useful gas, wherein gasification of the biomass in the gasification channel generates gases whilst the biomass is mechanically transported in the gasification channel towards the ash discharge, the gases forming the clean useful gas, wherein the cooler is a tube cooler having tubes, rotating brushes disposed in the tubes, and a collecting unit, wherein the tubes have tubular walls, and wherein the rotating brushes are capable of transporting oil, tar, water and other forms of deposits condensed on the tubular walls away to the collecting unit.

23. Gas generator according to claim 22, wherein the rotating brushes are helical, and wherein the tubes are arranged to be upright.

24. Pyrolytic gas generator for generating clean useful gas from biomass, the pyrolytic gas generator comprising a gasification channel in multi-chambered construction, an assist burner able to supply heat from the outside to the gasification channel during gasification of the biomass, a pre-pyrolyzing pipe connected upstream of the gasification channel, the biomass being dried and pre-pyrolyzed when passed through the pre-pyrolyzing pipe, an ash discharge downstream of the gasification channel, and a gas washer connected at least indirectly with an end of the gasification channel, wherein gasification of the biomass in the gasification channel generates gases whilst the biomass is mechanically transported in the gasification channel towards the ash discharge, the gases forming the clean useful gas, and wherein after exiting the gasification channel the gases are washed in the gas washer with an oil mist to convert the gases to the clean useful gas.

25. Gas generator according to claim 24, wherein the gas washer comprises an oil washer comprising a plurality of rotating oil nozzles, and a rotating centrifuging wheel surrounding the plurality of rotating oil nozzles so that a space is formed between the rotating centrifugal wheel and the plurality of rotating oil nozzles, wherein the gases are conducted into the space between the plurality of rotating oil nozzles and the rotating centrifugal wheel.

26. Gas generator according to claim 25, wherein the plurality of rotating oil nozzles and the rotating centrifugal wheel generate the oil mist, and wherein the gas washer further comprises a mist collector capable of separating the clean useful gas from the oil mist.

27. Gas generator according to claim 26, wherein the mist collector comprises a plurality of baffle plates arranged to be offset, angled, or offset and angled relative to one another, and an oil reserve, wherein the oil mist and contaminants mixed with the oil mist are separated at the plurality of baffle plates and are conducted away to the oil reserve.

28. Gas generator according to claim 24, further comprising a filter insert connected to a path of the gases downstream of the gas washer.

29. Gas generator according to claim 26, wherein the mist collector is arranged coaxially with the oil washer.

30. Gas generator according to claim 27, wherein the oil mist and the contaminants mixed with the oil mist form laden oil in the oil reserve, and further comprising an oil transport device for feeding the laden oil to the assist burner.

31. Pyrolytic gas generator for generating clean useful gas from biomass, the pyrolytic gas generator comprising a gasification channel in multi-chambered construction, an assist burner able to supply heat from the outside to the gasification channel during gasification of the biomass, a pre-pyrolyzing pipe connected upstream of the gasification channel, the biomass being dried and pre-pyrolyzed when passed through the pre-pyrolyzing pipe, an ash discharge downstream of the gasification channel, a first heat feed channel for the feed of external heat to the pre-pyrolyzing pipe, a second heat feed channel for the feed of external heat to the gasification channel, and guide plates protruding into the second heat feed channel and disposed at the gasification channel, wherein gasification of the biomass in the gasification channel generates gases whilst the biomass is mechanically transported in the gasification channel towards the ash discharge, the gases forming the clean useful gas.

* * * * *